US006065637A

United States Patent [19]

Takada

[11] Patent Number: 6,065,637

[45] Date of Patent: May 23, 2000

[54] CONNECTOR SUPPLY METHOD AND DEVICE

[75] Inventor: Kazuhiko Takada, Haibara-gun, Japan

[73] Assignee: Yazaki Corporation, Tokyo, Japan

[21] Appl. No.: 09/321,616

[22] Filed: May 28, 1999

Related U.S. Application Data

[62] Division of application No. 08/805,754, Feb. 25, 1997.

[30] Foreign Application Priority Data

Feb. 27, 1996 [JP] Japan .................................... 8-39736

[51] Int. Cl.$^{7}$ .................................................. B65G 59/00

[52] U.S. Cl. ...................................... 221/298; 198/463.6

[58] Field of Search .................................. 221/298, 278, 221/289; 198/463.6, 493, 459.7

[56] References Cited

U.S. PATENT DOCUMENTS 2,611,911 9/1952 Graham et al. ......................... 221/298
4,646,404 3/1987 Matsui .................................. 29/33 M

FOREIGN PATENT DOCUMENTS 0 422 327 A1 4/1991 European Pat. Off. .
277 166 A1 3/1990 Germany .
92 15 227 4/1994 Germany .

OTHER PUBLICATIONS

German Patent and Trademark Office Communication, Jun. 19, 1999, for Application No. 1090992.

*Primary Examiner*—Kenneth W. Noland
*Attorney, Agent, or Firm*—Armstrong, Westerman, Hattori, McLeland and Naughton

[57] ABSTRACT

In a connector supply apparatus, a plurality of connectors are successively shifted along a shifting passage of a rail member, and a desired number of preceding connectors are separated from the succeeding connectors by the rise/fall of a pair of stoppers spaced from each other by a prescribed distance L above the shifting passage and the air blow-off from a separator located above the shifting passage.

6 Claims, 14 Drawing Sheets

CONNECTOR SUPPLY METHOD AND DEVICE

This application is a division of prior application Ser. No. 08/805,754 filed Feb. 25, 1997

BACKGROUND OF THE INVENTION

1. Field of the Invention

The present invention relates to a method and device for supplying a connector to be sent to a connector crimping device.

2. Description of the Related Art

A previously known electric wire crimping device for crimping an electric wire on a crimping terminal of a connector is shown in FIGS. 15 and 16 as disclosed in JP-A-60-14780.

The electric wire crimping device, indicated by generally, a includes a guide b for passing a plurality of electric wires W, a chuck c for chucking the front end of each of the electric wires W, a transporting chain d for moving the chuck c, a cutter e for cutting the plurality of electric wires W, a crimping punch g and crimping die h for simultaneously crimping the plurality of electric wires on terminals of a connector f and a holding cylinder i for holding the rear end of each of the plurality of electric wires.

The front end of each of the electric wires cut by the cutter e is crimped on the terminals of a first connector c1 by the crimping punch g and crimping die h as shown in FIG. 16. Next, the transporting chain d is driven to shift the connector c1 forward. Then, the terminals of a second connector c2 are connected to the intermediate portions of the electric wires W. After the transportation chain d moves forward, the terminals of a third connector c3 are connected to the wires. By moving the transporting chain d forward, the wires are cut at the rear end of the third connector c3.

Thus, the conventional wire crimping device a connects a plurality of connectors c1, c2, c3, . . . in series to the wires W in a longitudinal direction.

FIG. 17 shows an exemplary connector supplying apparatus for supplying the connectors c1, c2, c3, . . . on which the electric wires are crimped using the above wire crimping device a which is a working object machine.

This wire crimping device places the connectors c1, c2, c3, . . . between the adjacent ones of a large number of upright rods arranged on a conveyer i and shifts them to a rear stage by the conveyer.

Another example of the connector supplying apparatus is disclosed in FIG. 18 which slides down the connectors c1, c2, c3, . . . sloped with an angle of θ within an accommodation groove of a rail material 1 using the slope.

The above connector supply apparatus shown in FIG. 17 has the following disadvantages. In the conventional connector supply apparatus, the connectors c1, c2, c3, . . . are placed between the adjacent ones of the upright rods k arranged on the conveyer i so as to be shiftable. For this reason, where the wording object machine is the wire crimping device a shown in FIG. 15, the connectors c1, c2, c3, . . . must be shifted successively from the connector supply device synchronously with the crimping state for the electric wires W to the connectors c1, c2, c3, . . . If not, the transport chain d will be crowded with the connectors c1, c2, c3, thus hindering smooth wire crimping.

If control is made so that the crimping state of the wires on the connectors c1, c2, c3 . . . is in synchronism with the supply of the connectors c1 c2, c3, . . . , the structure of the connector supply means is complicate, thus making its fabrication and assembling difficult. In addition, in such a connector supply device, it was difficult to shift the connectors c1, c2, c3, . . . arranged with their orientation to the working object machine.

In order to stop shifting the connectors c1, c2, c3, . . . or supply them to the wire crimping device a and cause them to stand by, the above conventional connector supply device must stop the conveyer i itself. Thus, the wire crimping device a takes a long time and much labor for the wire crimping.

The connector supply device shown in FIG. 18 is simple in structure, and can be easily fabricated and assembled. However, the connectors c1, c2, c3, . . . which slide down are apt to make a string thereof. Thus, it was difficult to separate a necessary number of connectors from the succeeding connectors and supply them to the working object.

SUMMARY OF THE INVENTION

An object of the present invention is to provide a connector supply method and apparatus which is simple in structure and can be easily fabricated and assembled; can separate a necessary number of connectors from the succeeding connectors easily and surely and supply them to a working object machine; and can enhance the working efficiency of the working object machine.

In accordance with the present invention, there is provided a connector supply apparatus comprising: a rail member having a shifting passage along which a plurality of connectors are shifted; shifting means for forcibly shifting the plurality of connectors along the shifting passage; a pair of forward and backward stoppers so as to be risable/fallable, spaced apart from each other by a prescribed distance in a connector shifting direction above said shifting passages, while the plurality of connectors are shifted by said shifting means, the backward stopper rising to open the shifting passage and the forward stopper falling to define the stopping position of the most precedent stopper; an sensor for detecting the presence or absence of a connector; and a separator arranged said stoppers for separating a precedent connector of said plurality of connectors from the succeeding connectors.

Said shifting means and separator are preferably blowers for air blow-off.

In the connector supply device according to the present invention, on the rail member as a connector shifting passage are provided a pair of stoppers for stopping the shift of the connectors, a sensor for confirming the presence of a connector, a shifting means for successively shifting the connectors, and a separator for separating the connectors from one another, and a blower is used as the shifting means and the separator. For this reason, the connector supply device is simple in structure and can be easily fabricated and assembled. In addition, a desired number of connectors can be surely separated and supplied to the working object machine.

The supply of connectors can be easily controlled by blowing off the air from the connector shifting means in accordance with the processing state in the crimping machine and the separator and driving a pair of stoppers. Further, without stopping the supply of the connectors, the work in the working object machine can be effectively carried out.

The above and other objects and features of the present invention will be more apparent from the following description taken in conjunction with the accompanying drawings.

DESCRIPTION OF THE PREFERRED EMBODIMENTS

Figure 1:
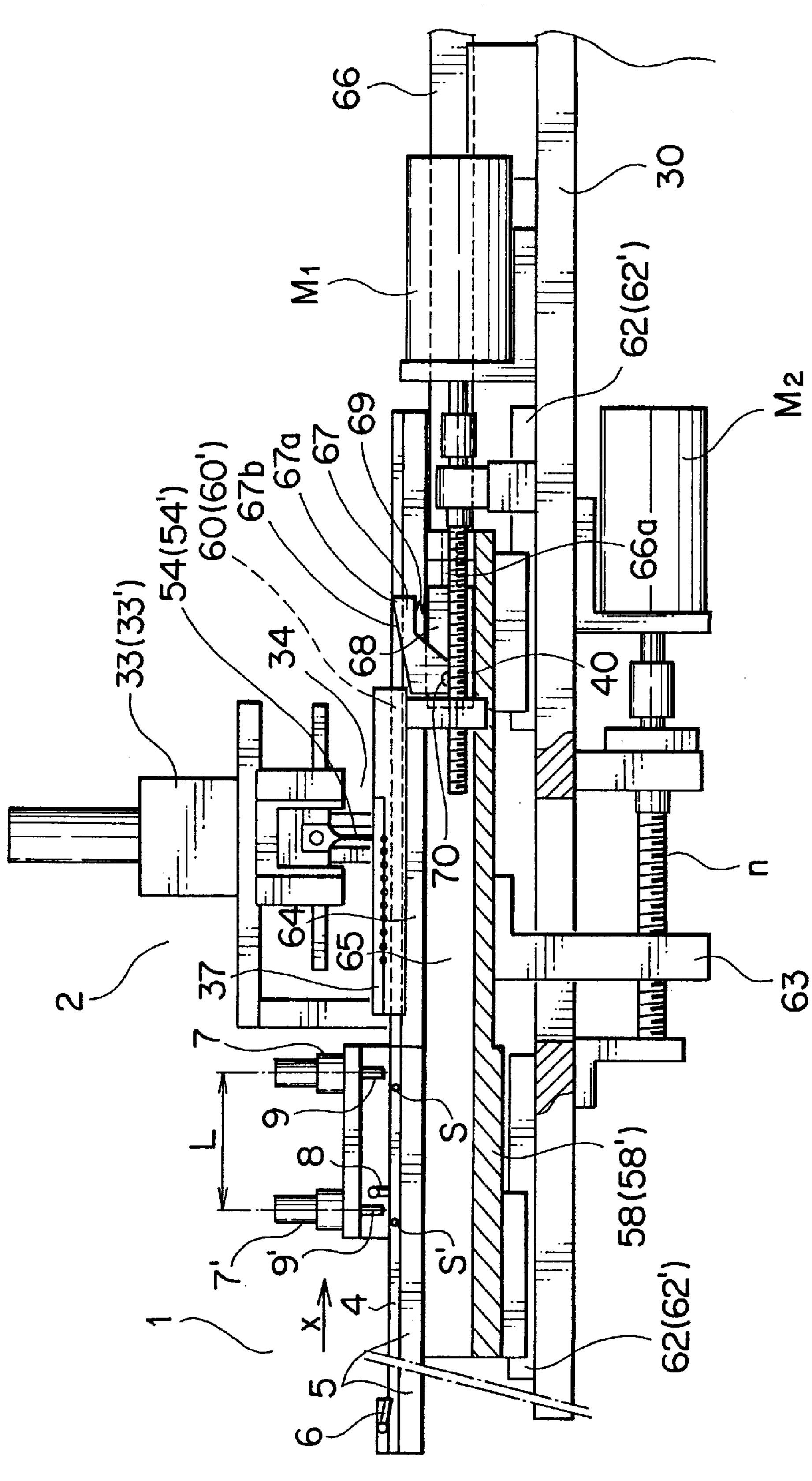
FIG. 1 is a front view showing an embodiment of the connector supply device according to the present invention which is to be sent to a wire crimping device as a working object machine.

Now referring to the drawings, an explanation will be given of embodiments of the present invention.

In FIGS. 1 to 14, reference numeral 1 generally denotes a connector supply device and reference numeral 2 generate denotes a wire crimping device as a working object machine to which the connector supply device is connected.

The connector supply device 1 includes plural (two in the drawing) rows of rail members 5 each having a shifting passage 4 for guiding a plurality of connectors 3*a*, 3*b*, 3*c*, . . . , a shifting means 6 for forcibly shifting them in the shifting passages 4; a pair of front and rear stoppers 7 and 7' located above the shifting passage 4, which are spaced apart from each other by a prescribed distance L in a shifting direction a and can fall/rise; sensors S and S' for sensing the connectors 3*a*, 3*b*, 3*c*, . . . in front of the stoppers 7 and 7 in the direction a of shifting the connectors 3*a*, 3*b*, 3*c*, . . . , respectively; and a separator 8 for separating the preceding connector 3*a* from the succeeding connectors 3*b*, 3*c*, . . .

In this embodiment, in the connector supply device 1, a pair of rows of rail members 5 are arranged for a pair of crimping cylinders 33 and 33' (described later) of the wire crimping device 2 as a working object machine.

Figure 4:
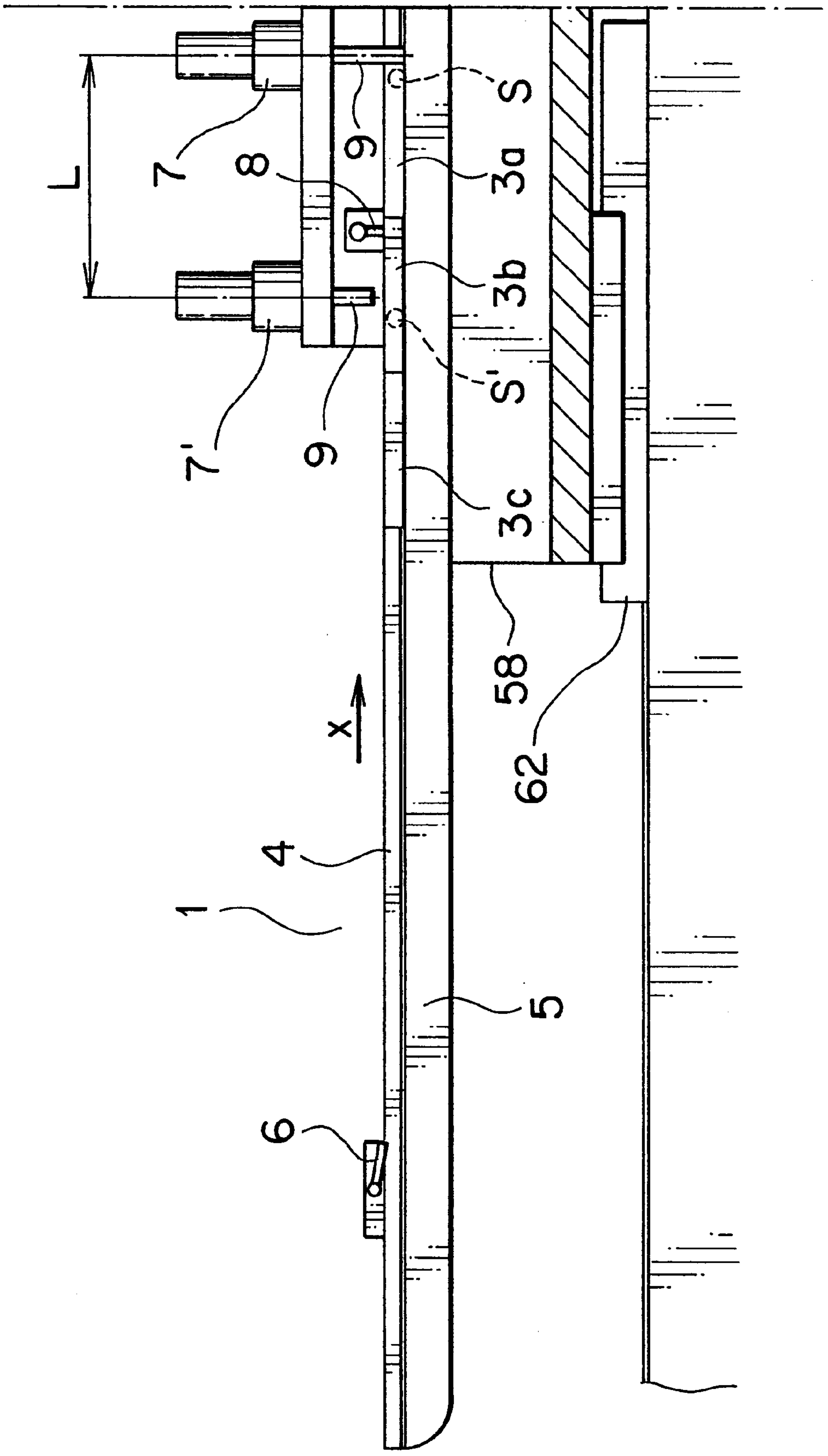
FIG. 4 is a sectional view of the state where the connectors, while pressed on a rod of a front stopper means by wind pressure of a shifting means, are shifted.
Figure 5:
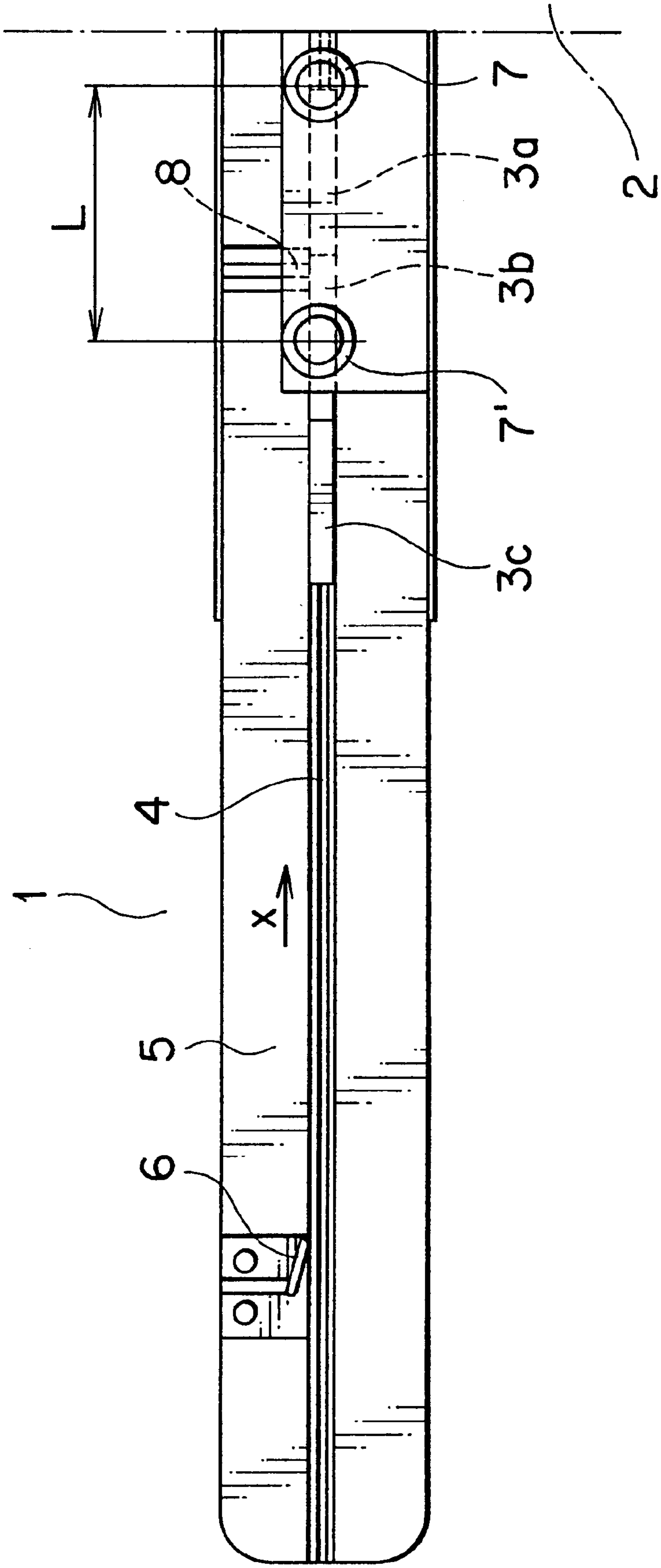
FIG. 5 is a plan view of FIG. 4.

The above pair of stoppers 7 and 7' are preferably air cylinders having rods 9 and 9' which can rise or fall in the shifting passage 4. While plural connectors 3*a*, 3*b*, 3*c*, . . . are shifted by the shifting means 6, the rear stopper 7' opens the shifting passage 4 by rise of the rod 9' to permit the shift of the connectors 3*a*, 3*b*, 3*c*, . . . (FIG. 4). The front stopper 7 serves to control the stopping position of the most preceding connector 3*a*.

The desired distance L between the stoppers 7 and 7' is a distance over which two or more connectors 3*a*, 3*a*, 3*c*, . . . can be arranged successively, for example, two connectors 3*a* and 3*b* are extended over the stoppers 7 and 7', or which extends from the starting point the two connectors 3*a* and 3*b* to the ending point thereof.

The shifting passage 4 may be a groove having a square section or U-section through which the connectors 3*a*, 3*b*, 3*c*, . . . can be shifted.

The sensors S and S' are most preferably optical sensors such as a photoelectric tube, and may be magnetic means such as a magnetic sensor or a mechanical contact means such as a microswitch.

The separator 8 is provided between the pair of stoppers 7 and 7'. Further, the separator 8 is located at a desired position of successive connectors 3*a*, 3*b*, 3*c*, . . . set in the shifting passage 4, for example, between the burrs or flashes 21 which protrude from the connectors 3*a*, 3*b*, 3*c*, . . . or the partition walls of the terminal chambers 22 of each of the connectors 3*a*, 3*b*, 3*c*, . . . , so as to cross the shifting direction a of the connectors 3*a*, 3*b*, 3*c*, . . . Incidentally, the burr is located at the starting tip of e.g. (n−1)-th connector 3*b* or at the ending tip of the first connector 3*a*. The separator 8 serves to separate a desired number of preceding connector (s), e.g. the most preceding connector 3*a*, from the succeeding connectors 3*b*, 3*c*, . . . In this embodiment, the separator 8 is a blower. Under the wind pressure of air blown off from the blower, the preceding connector 3*a* is separated from the succeeding connectors 3*b*, 3*c*, . . . In this state, these connectors will be successively supplied into the working object machine.

The shifting means 6 may be a blower provided above the shifting passage 4 toward the shifting direction a of the connectors 3*a*, 3*b*, 3*c*, . . . Under the wind pressure of the air blown off from the blower, the connectors 3*a*, 3*b*, 3*c*, . . . will be shifted forward.

The wire crimping device 2 includes a movable table 30 equipped with a caster, a wire introducing unit (not shown), a wire selection unit 31 (FIGS. 1, 9 and 10), a wire-length measuring unit 32, and a wire crimping unit 34 having a pair of crimping cylinders 33, 33'. The wire introducing unit, wire selection unit 31, wire-length measuring unit 32 and the wire crimping unit 34 are arranged on the table 30.

Figure 11:
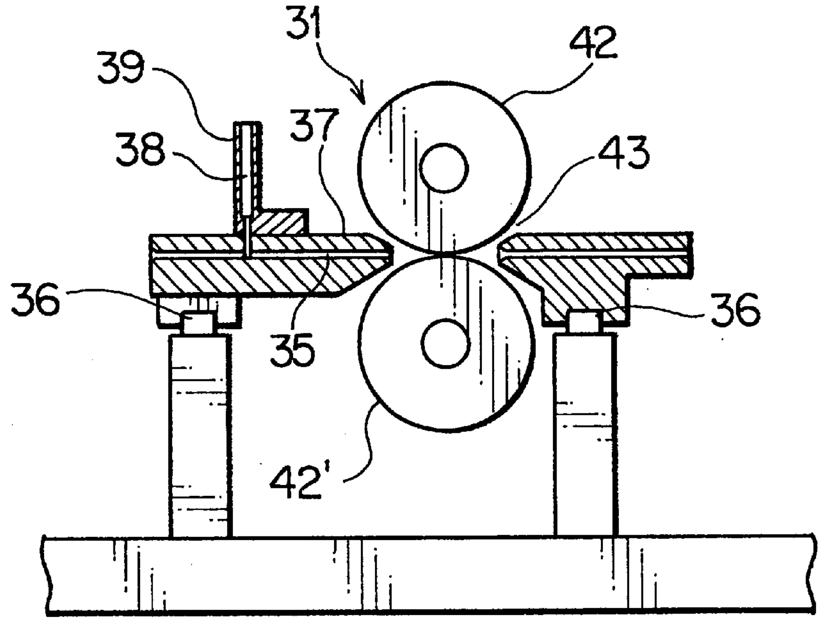
FIG. 11 is a sectional view of a wire selecting section which is a part of the working object machine.

The wire selection unit 31, as shown in FIG. 11, includes a wire guide stand 37 which has a wire passing through-hole 35 and is movable along the rail members 36 in a direction of arranging the wires, a cylinder wall 39 uprighted at the front end of the wire guiding stand 37 and vertical-air type incorporating minute pressing cylinders 38 for the wires W taken from the wire introducing unit and a motor M1 for driving a screw shaft 40 screwed to the wire guide stand.

At the center of the wire guide stand 37, an advancing window 43 for a pair of upper and lower wire-length rollers 42 and 42' of the wire-length measuring unit 32 is provided.

A single selected wire W is passed through the wire passing through hole of the wire guiding stand 37. The other wires are pressed by the pressing cylinder 38. The selected wire W is positioned between upper and lower wire-length measuring rollers 42 and 42' by the horizontal movement of the wire guiding stand 37.

Figure 12:
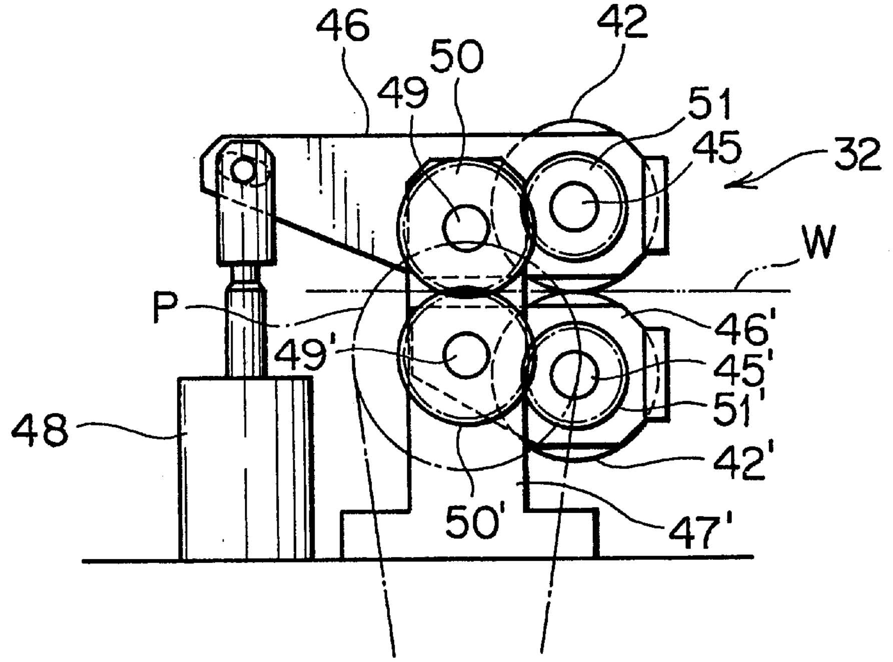
FIG. 12 is a side view of a wire measuring section which is part of the working object machine.
Figure 13:
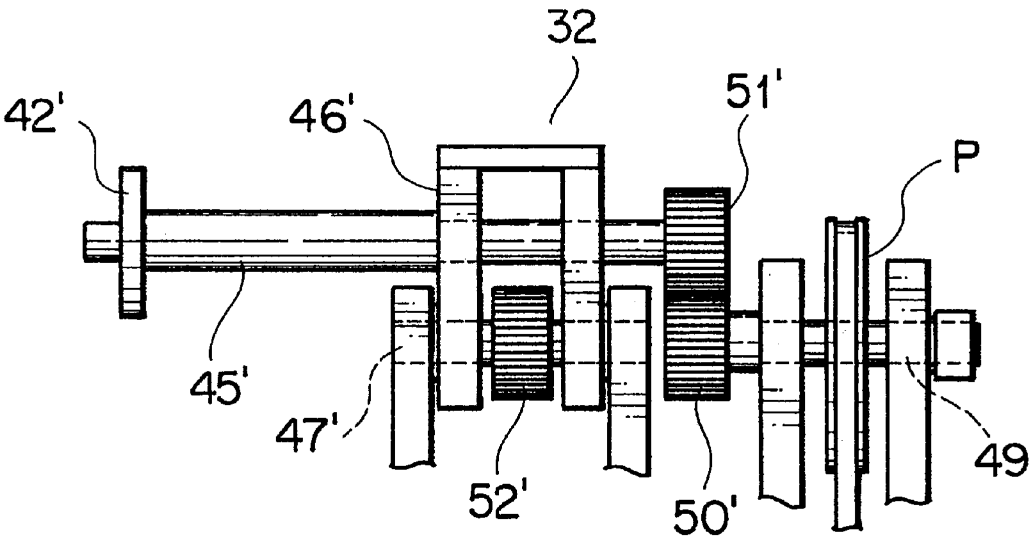
FIG. 13 is a plan view of a drive of a lower measuring roller.
Figure 14:
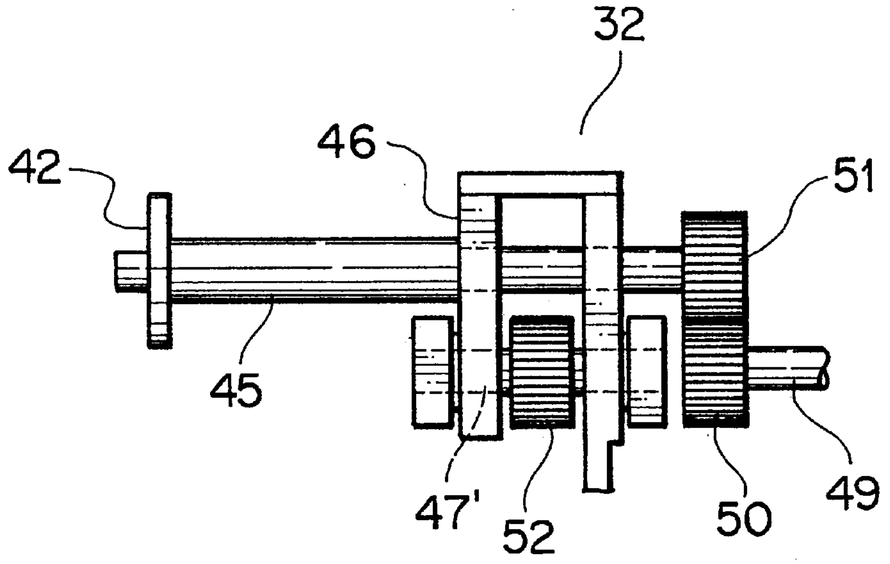
FIG. 14 is a plan view of a drive of a lower measuring roller.
Figure 15:
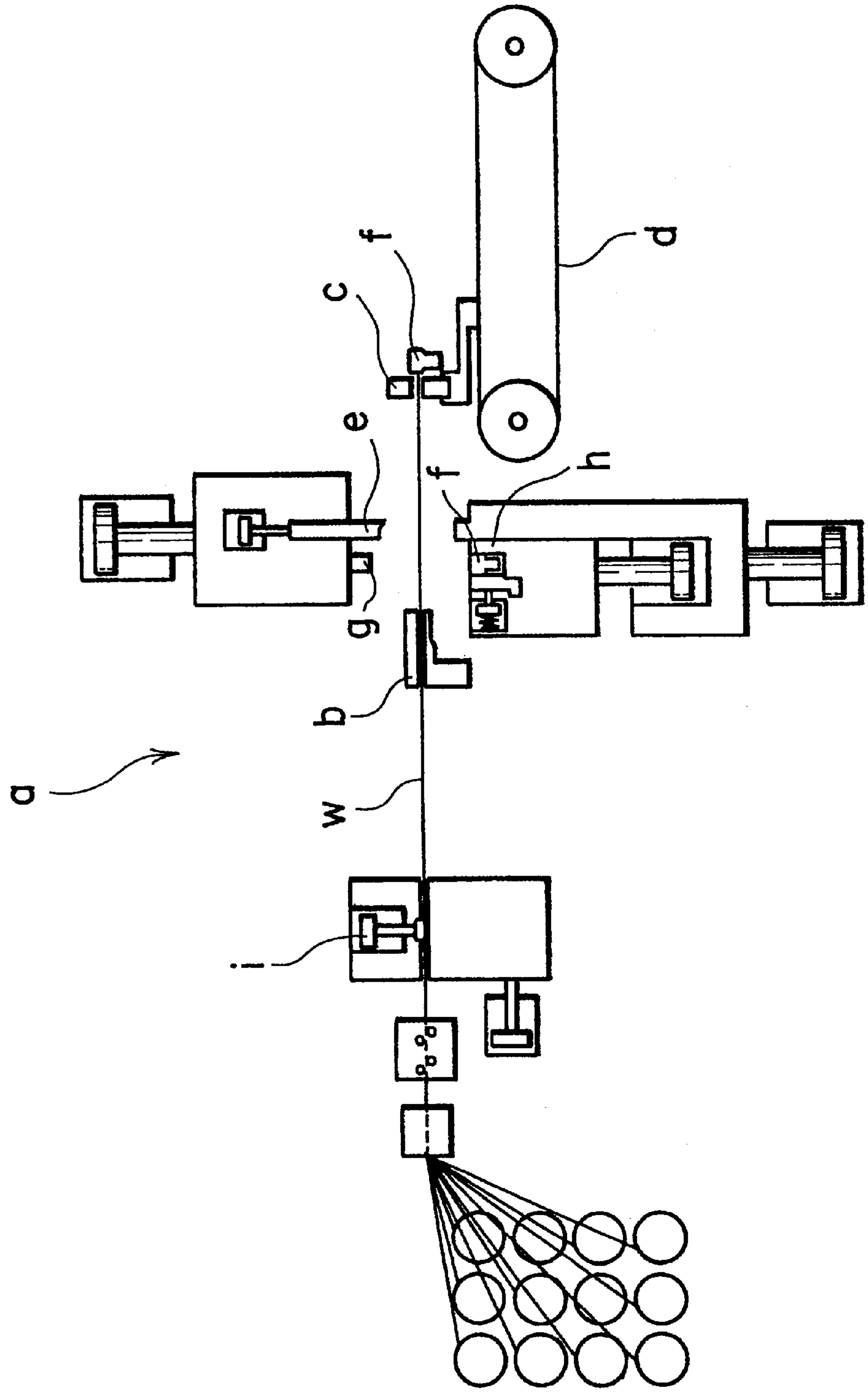
FIG. 15 PRIOR ART
FIG. 15 is a side view of a conventional wire crimping device.
Figure 16:
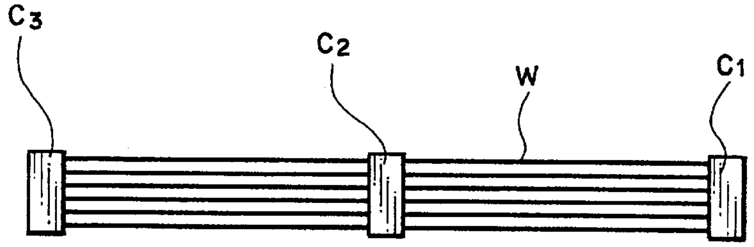
FIG. 16 PRIOR ART
FIG. 16 is a plan view of the state where wires are connected to the connectors in the conventional wire crimping device.
Figure 17:
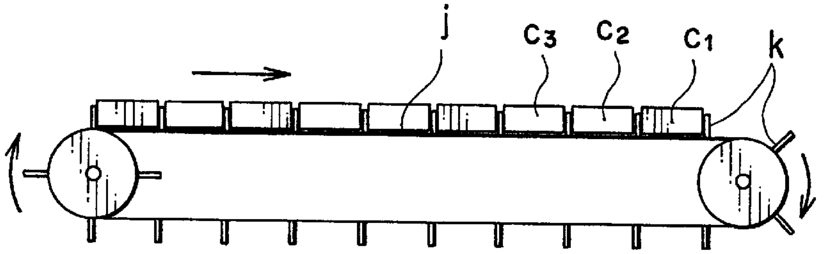
FIG. 17 PRIOR ART
FIG. 17 is a front view of a conventional connector device.
Figure 18:
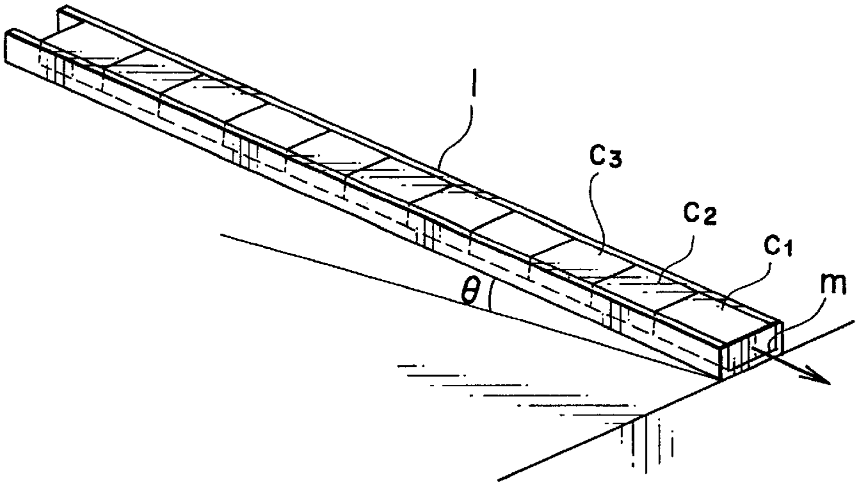
FIG. 18 PRIOR ART
FIG. 18 is a perspective view of another conventional connector supply device.

The wire-length measuring unit 32, as shown in FIGS. 12 to 14, includes a pair of upper and lower wire-length measuring rollers 42, 42', a pair of upper and lower wire-length swinging plates 46, 46' having a pair of rotary shafts 45, 45' with the rollers 42, 42' fixed at their tips passing therethrough and axially supported, a post 47' with the swing plates 46, 46' axially supported to be rotatably, a vertical air swing cylinder 48 with its tip connected to the stem of the upper swing plate 46, an upper and lower driving wheels 50, 50' attached to the driving shafts 49, 49' and toothed with each other, slave wheels 51, 51' secured to the stems of the rotary shafts of the wire-length measuring rollers 42, 42', a belt pulley P fixed to the lower driving shaft 49', and swing wheels 52, 52' centrally secured to the upper and lower supporting shafts 47, 47'.

The wire-length measuring rollers 42, 42' are always rotated by rotation of the upper and lower driving wheels 50, 50' toothed each other, and are connected or disconnected by the expansion or contraction of the swing cylinder 48. The wire W is driven simultaneously by the upper and lower wirelength measuring rollers 42 and 42' so that it can be fed out by uniform force. The wire W is primarily measured linearly by the wire-length measuring rollers 42, 42' and sent into the wire crimping unit 34.

Figure 9:
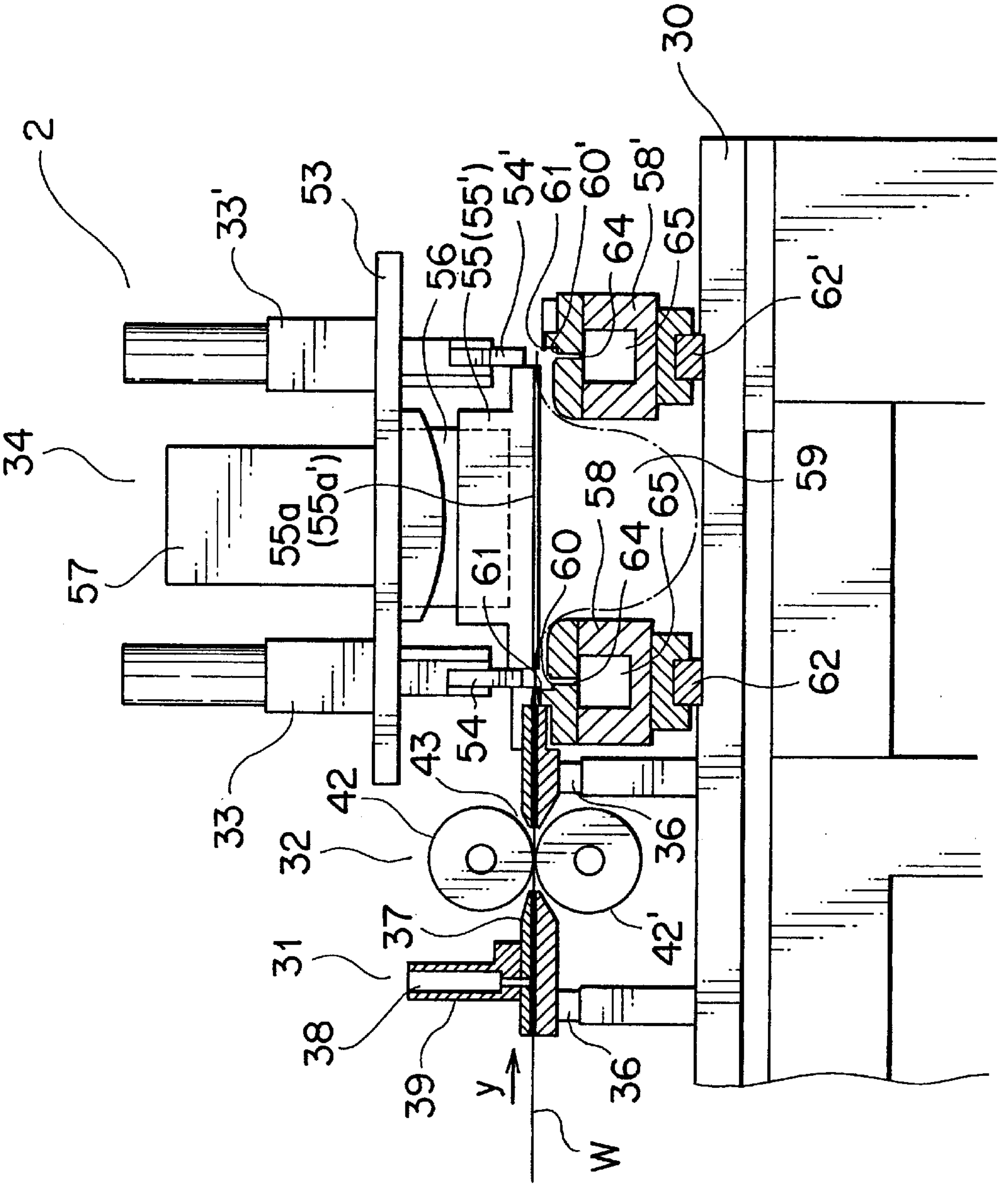
FIG. 9 is a side view of an exemplary wire crimping device as a working object machine mounted on the rear stage of a connector supply device according to the present invention.

The wire crimping unit 34, as shown in FIG. 9, includes a pair of vertical air type crimping cylinders 33, 33' installed on the fixed stand 53 and having crimping blades 54, 54' fixed to their rod tips, and chuck cylinder 56 centrally installed on the fixed stand 53 between the pair of crimping cylinders 54, 54' and having a pair of wire guides 55, 55'.

The pair of wire guides 55, 55' have wire passing-through grooves 55*a*, 55*a'* with their sections being semi-circular or square, and the front end and rear end of the wire guides 55, 55' are in proximity to the crimping 54 and 54'. A wire pushing-down cylinder 57 is centrally installed on the fixed stand 53 between the crimping cylinders 33, 33'. A rod 57*a* of the wire pushing-down cylinder 57 advances in between the pair of open wire guides 55 and 55' to push down the wire sent out by the wire-length rollers 42 and 42' in a U-shape.

Below the crimping cylinders 33, 33', moving tables 58 and 58' which correspond to the rail members of the connector supply device 1 are arranged sandwiching a hollow area 59 therebetween. Connector grooves 60 and 60' of the moving tables 58 and 58' are arranged oppositely to the crimping blades 54 and 54'.

Reference numeral 61 denotes a square block blade arranged above the outer periphery of each of the connector grooves 60, 60' in the connector grooves 60, 60'. Immediately before the wire W is crimped on the connectors 3 within the connector accommodating grooves 60, 60', it is cut.

The moving tables 58, 58' are placed so as to be horizontally movable on the rails 62, 62' arranged on the table 30. The protruding portion of each of the moving tables 58 and 58' is screwed with the screw shaft n so that the moving tables 58, 58' are movable in a horizontal direction (which is orthogonal to the shifting direction of a wire) individually from each other by the motors M2 (FIG. 1). In addition, at the upper area of each of the moving tables 58, 58', the above connector accommodating grooves 60, 60' are formed below which hollow holes 65 are made to communicate with them through slits 64.

Reference numerals 66 denote one of air type connector cylinders whose rods are passed through the hollow holes 65, respectively. The tip of the rod 66*a* of the connector moving cylinder 66 is coupled with the a slide block 68 having a carrying hook 67 for hooking the connectors 3*a*, 3*b*, 3*c*, . . . supplied from the connector supply device 1 and sending out them.

The slide block 68 is mounted slidably within the hollow hole 65, and the carrying hook 67 moves within the slit 64 so that the tip 67*a* protruding into the connector accommodating groove 60, 60' can push the connectors 3*a*, 3*b*, 3*c*, . . .

The carrying hook 67 has a tapered rear portion 67*b* whose bottom is axially supported to the slide block 68 so as to be swingably by a pin 70 so that it is urged in a protruding direction of the tip 67*a* by a spring 69 provided on the side of the slide block 68. The rear portion 67*b* serves to prevent interference with the connectors 3*a*, 3*b*, 3*c*, . . . when the slide block 67 returns so that the carrying hook 67 pushes the spring to swing downward.

In one embodiment of the connector supply apparatus 1 having the structure described above, a worker will supply a desired number of connectors to the wire crimping device 2 as follows.

Figure 2:
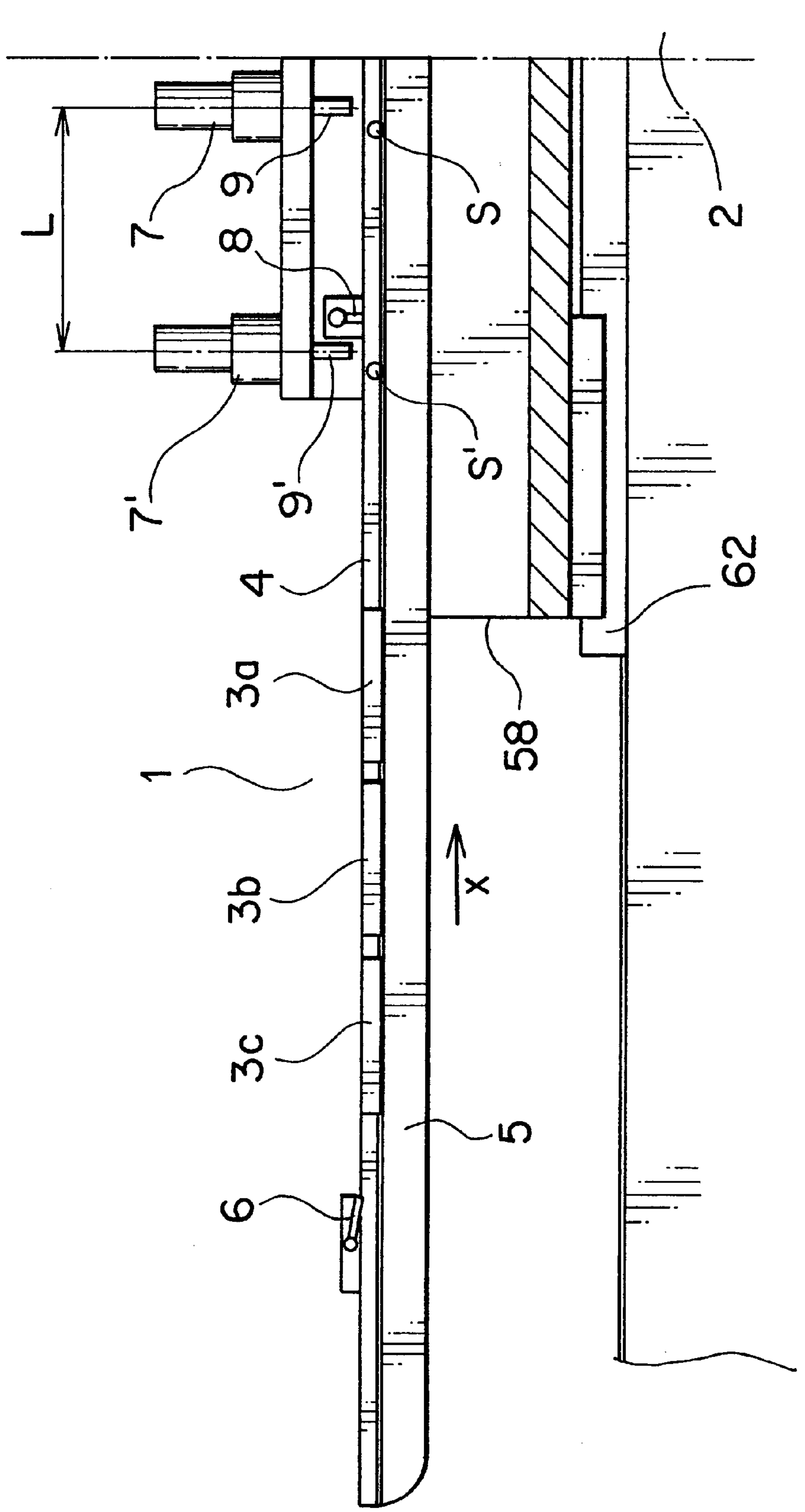
FIG. 2 is a sectional view of the embodiment of the connector supply device according to the present invention in which connectors are set continuously on a rail member.
Figure 3:
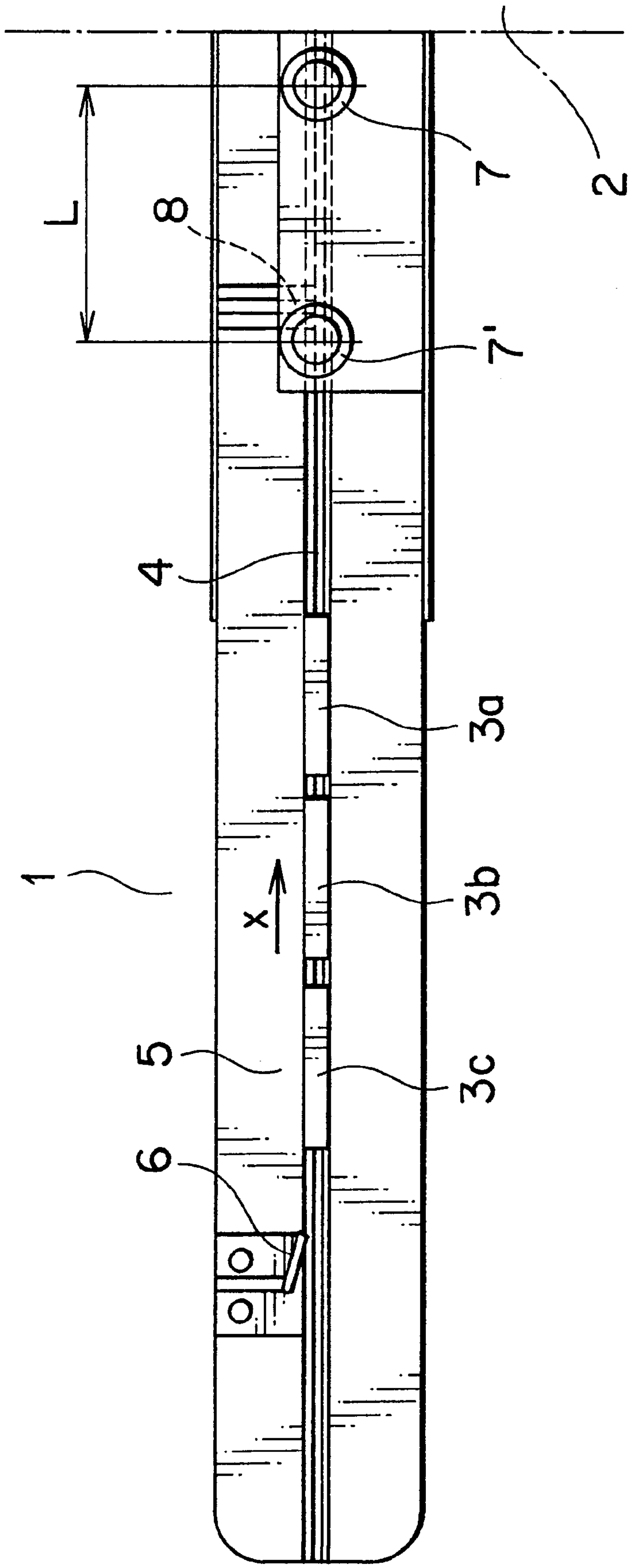
FIG. 3 is a plan view of FIG. 2.
Figure 10:
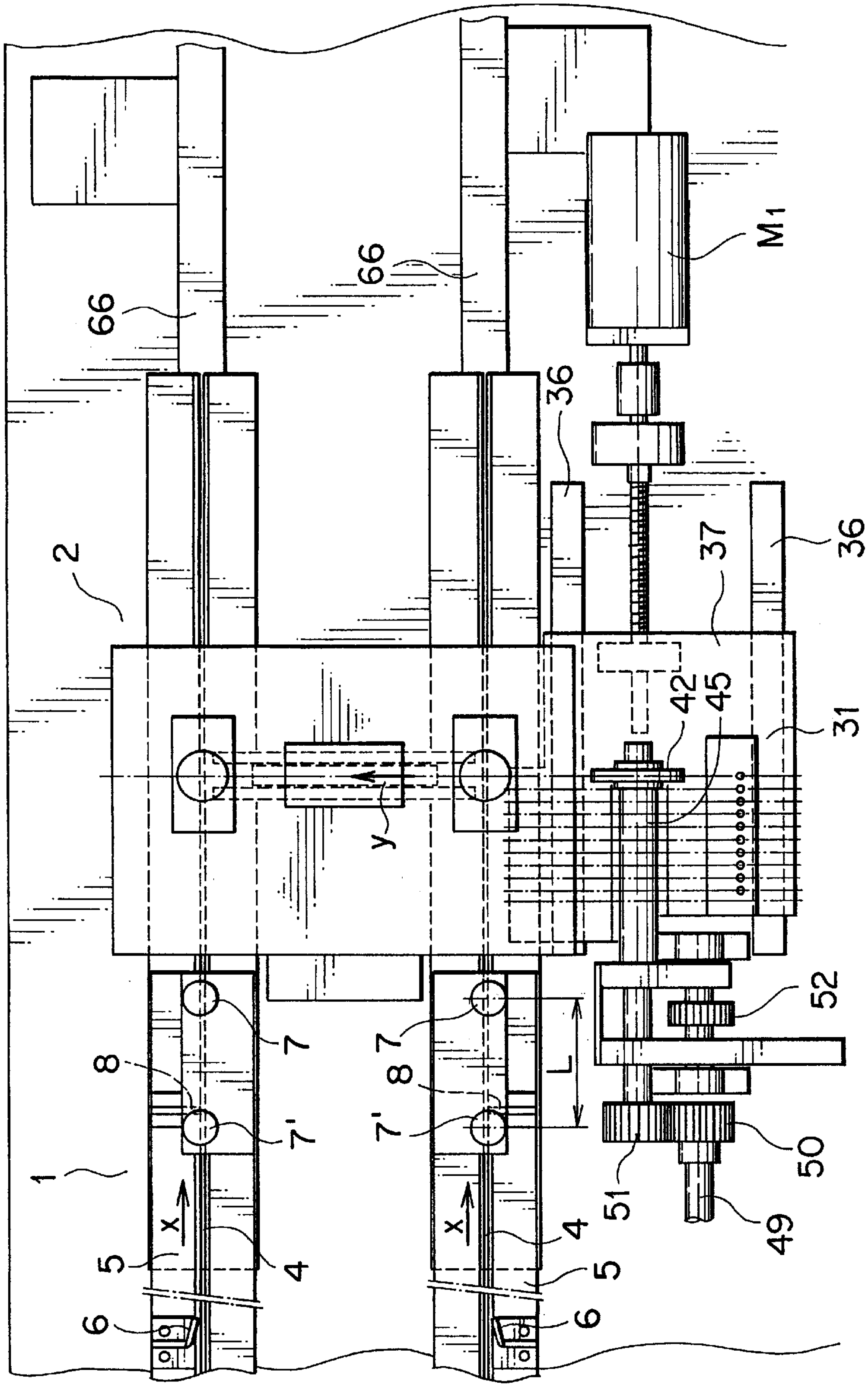
FIG. 10 is a plan view fo the whole view of the connector supply device according to the present invention.

First, the worker manually sets the plurality of connectors 3*a*, 3*b*, 3*c*, . . . successively in the shifting passages 4 of the rail members 5 arranged in parallel as shown in FIG. 10 (FIGS. 2, 3 and 10).

The rod 9 of the forward one of the pair of stoppers 7, 7' falls within each of the shifting passage 4 of the rail member 5 and waits to define the stopping position of the connectors 3*a*, 3*b*, 3*c*, . . . which are to come successively.

The blower serving as the shifting means blows off air in the shifting direction of a against the connectors 3*a*, 3*b*, 3*c*, . . . cast in the shifting passage 4 of the rail member 5, thus forcibly shifting the connectors 3*a*, 3*b*, 3*c*, . . . forward within the shifting passage 4 of the rail member 5. Thus, the most preceding connector 3*a* is pushed against the rod 9 of the front stopper 7 (FIG. 4). Then, while the rod of the front stopper 7 is at an falling position, the rod' of the rear stopper 7' is at a rising state. Therefore, the shifting passage 4 is opened so that the connectors 3*a*, 3*b*, 3*c*, . . . are shiftable by the shifting means 6.

After the most preceding connector 3*a* hits on the rod 9 of the forward stopper 7, further shifting of the connectors 3*b*, 3*c*, . . . is stopped. In this state, using the sensors S, S', it is detected whether or not the connector 3*a* and the succeeding connectors 3*b*, 3*c*, . . . are located at a separating position.

Figure 8:
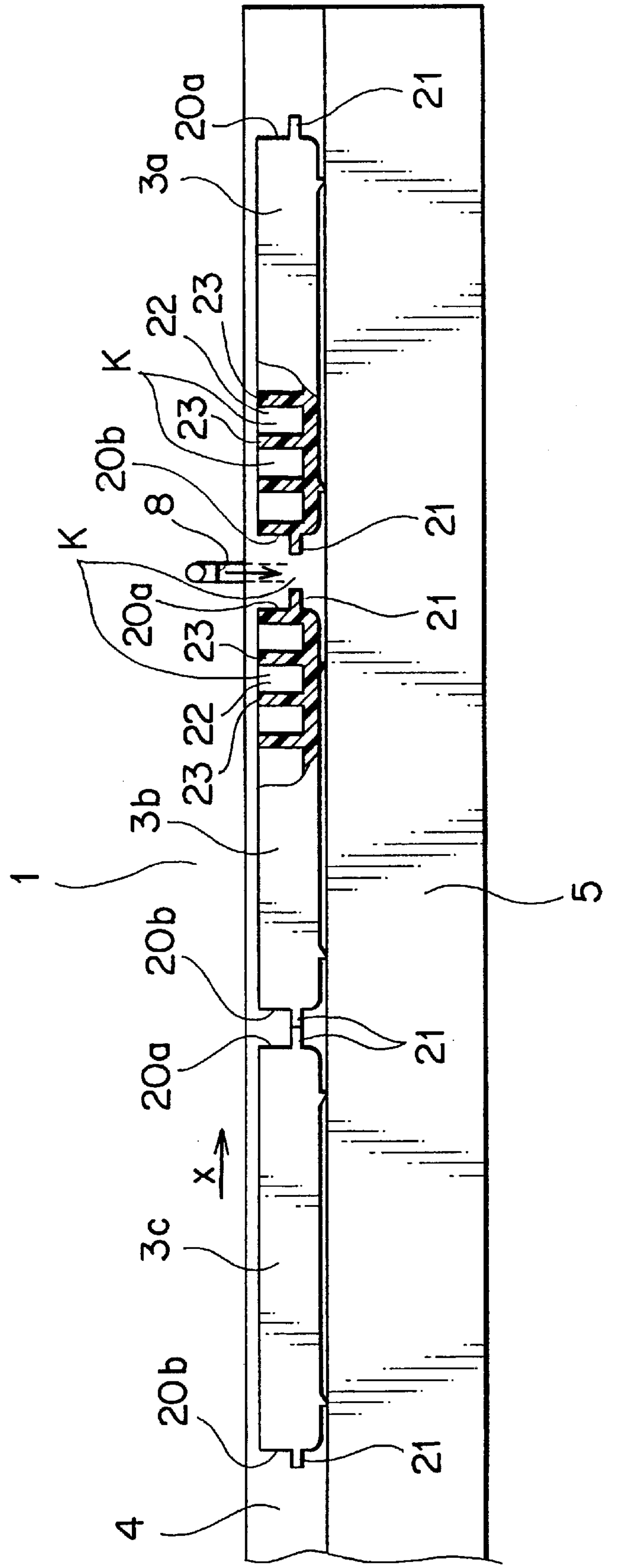
FIG. 8 is an enlarged sectional view illustrating the separation state of the connectors.

As shown in FIG. 8, when air is jetted from the separator 8 provided to cross the connector shifting direction a between the first stopper 7 and the second stopper 8, a desired number of connectors inclusive of at least the most preceding connector 3*a* is separated from the succeeding connectors 3*b*, 3*c*, . . . under the wind pressure of air.

In this case, the separator 8 serving as a blower is located to cross the connector shifting direction a in a space groove K formed by contact of the burrs 21 provided at the ending tip 20*b* of the most precedent connector 3*a* and the succeeding connector 3*b*, or formed between partition walls 23 formed for accommodating the terminals (not shown) in the connectors 3*a*, 3*b*, . . . For this reason, the air is jetted into the space groove K with less loss. Thus, under the wind pressure of the jetted air, the first connector 3*a* can be easily and surely separated from the succeeding second et seq connectors 3*b*, 3*c*, . . .

Figure 6:
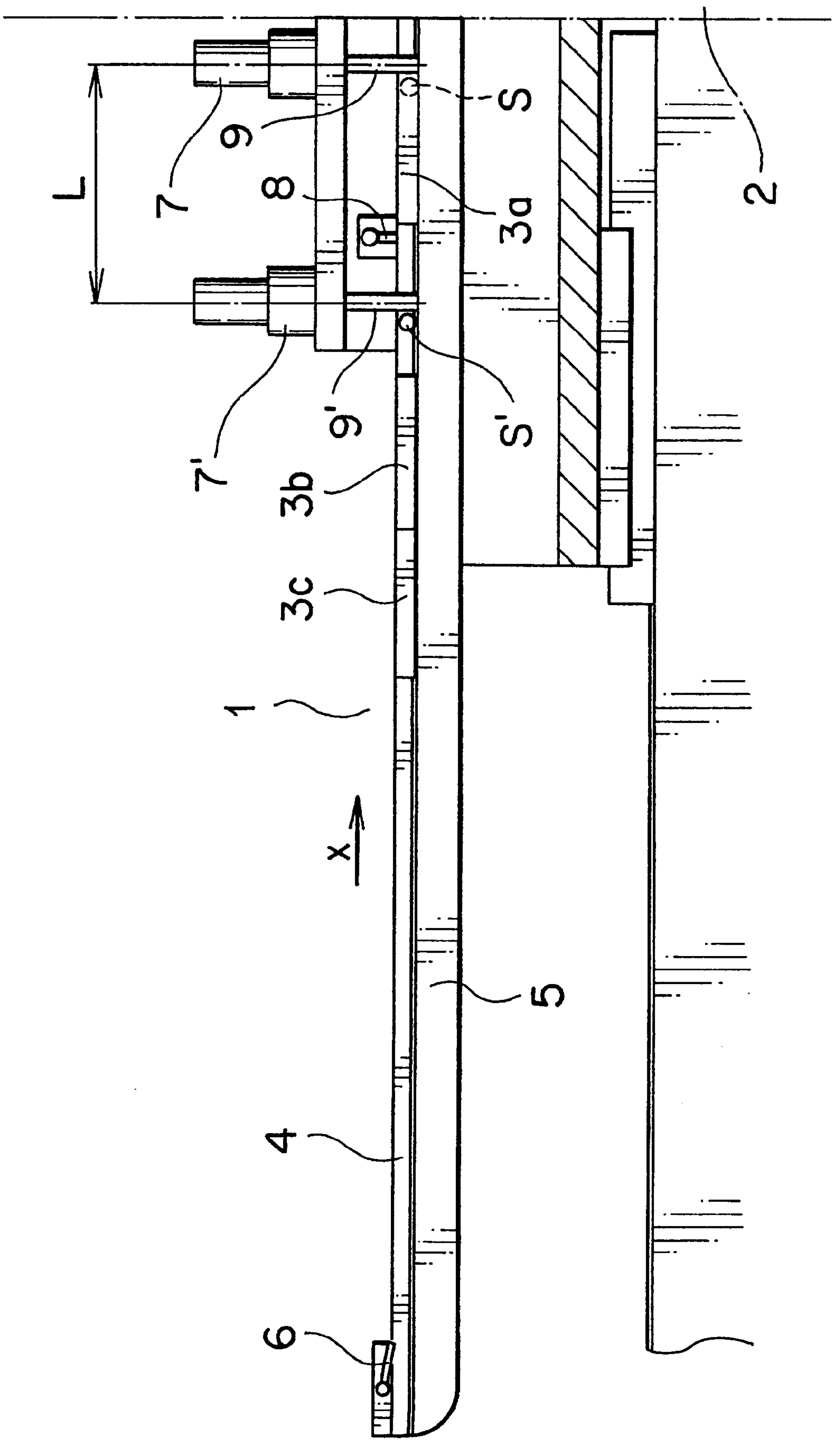
FIG. 6 is a sectional view showing the state where a preceding connector and the succeeding connector are separated by a separator.
Figure 7:
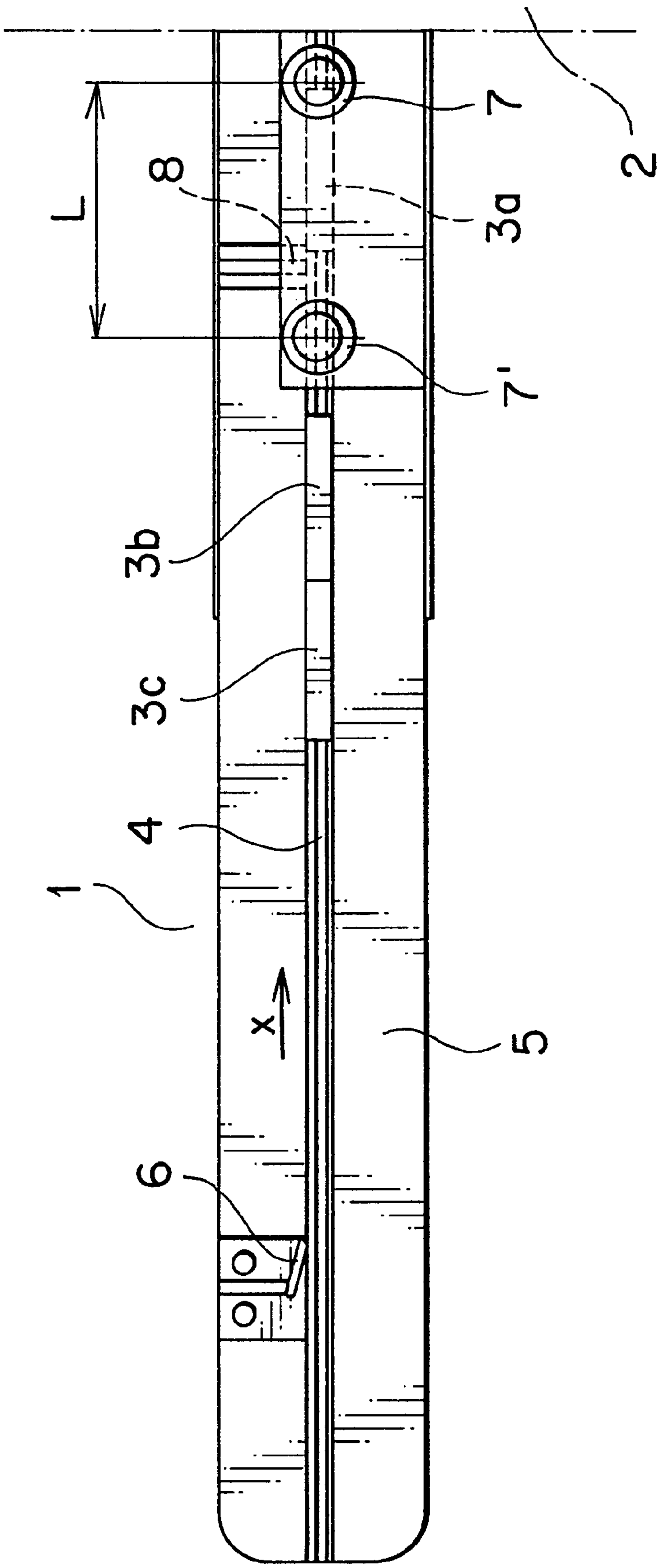
FIG. 7 is a plan view of FIG. 6.

Thereafter, the rod 9' of the backward stopper 7' falls. Then, the presence or absence of the precedent connector 3*a* is detected by the sensor S provided in front of the front stopper 7, whereas that of the succeeding connector 3*b* is detected by the sensor S' provided in front of the rear stopper 7'. Thus, it is detected that the preceding connector 3*a* has been separated from the succeeding connector 3*b*, 3*c*, . . . , completing the separation of the connectors (FIG. 6).

Such an operation will be repeated to separate successively the preceding connector 3*a* from the succeeding connectors 3*b*, 3*c*, . . . in the series of connectors which are shifting in the shifting passages of the rail members 5.

The pair of precedent connectors 3*a* thus separated from the succeeding connectors 3*b*, 3*c*, will be supplied to the wire crimping device 2 as a working object machine.

On the other hand, the wire W sent out from the wire-length measuring rollers 42, 42' passes the wire guides 55, 55' to be located to be opposite to the crimping blades 54, 54'.

The pair of moving tables 58, 58' are moved individually in a direction orthogonal to the wire shifting direction b so that the one connector 3*a* is crimped on the wire W from the side of the crimping cylinder 33. After the wire guide 35 is opened to extend the wire to a prescribed length, the other connector 3*a* is crimped on the wire from the side of the crimping cylinder 33' opposite to the crimping cylinder 33. Thus, the terminals of the connectors 3*a* are connected to the wire so as to cross the wire shifting direction b. It should be noted that the length of the wire sent out from the wire-length measuring rollers 42, 42' can be easily adjusted.

In the above embodiment, the air cylinder rods 9, 9' of the stoppers 7, 7' are designed to move into and from the shifting passage 4. Alternatively, the lever or link may be designed to move into and from the shifting passage 4.

In the above embodiment, with the pair of rail members 5 arranged in the wire crimping device 2 to supply the connectors 3*a*, 3*b*, 3*c*, . . . to the wire crimping device 2, the connectors are supplied to the wire crimping device in parallel by each pair of connectors and the pair of connectors 3*a*, 3*b*, 3*c*, . . . are crimped on both sides of the wire W. But the number of rails should not be limited to two and optionally selected so that the number of crimping the connectors to the wire can be easily changed.

The shift of the connectors 3*a*, 3*b*, 3*c*, . . . should not be limited to the case where they are shifted in synchronism with the crimping state for the wire W. For example, by adjusting the drive starting time and driving time of the shifting means 6 and a pair of stoppers 7, 7' provided on each of the rail members 5, the supply of the connectors 3*a*, 3*b*, 3*c*, . . . can be easily controlled in accordance with the wire crimping state for the wire W. In addition, without stopping the shift or supply of the connectors 3*a*, 3*b*, 3*c*, . . . the wire crimping operation can be easily and surely carried out, thus improving the working efficiency.

Further, the connectors 3*a*, 3*b*, 3*c*, . . . can be guided to the shifting passages of the rail members 5 so as to be supplied in alignment in a prescribed direction.

Furthermore, in the above embodiment, although only one preceding connector was separated from the succeeding connectors by the air jetted from the blower, two or more preceding connectors may be separated from the succeeding connectors.

In the above embodiment, although the connectors was shifted using the air jetted from the blower, they may be shifted by mechanical means such as a pin provide movably in the connector shifting direction.

What is claimed is:

1. A connector supply apparatus comprising:

a rail member having a shifting passage along which a plurality of connectors are shifted;

shifting means for forcibly shifting the plurality of connectors along the shifting passage;

a pair of forward and backward stoppers so as to be risable/fallable, spaced apart from each other by a prescribed distance in a connector shifting direction above said shifting passages, while the plurality of connectors are shifted by said shifting means, the backward stopper rising to open the shifting passage and the forward stopper falling to define the stopping position of the most precedent stopper;

sensors arranged in front of and behind said stoppers for detecting the presence or absence of a connector; and a separator arranged between said stoppers for separating a precedent connector of said plurality of connectors from the succeeding connectors.

2. A connector supply apparatus according to claim 1, wherein said pair of stopper means are apart from each other by a distance over which at least two connectors are successively arranged, and said separator is located in a spacial groove formed between an n-th connector and a (n+1)-th connector or between partition walls of the (n+1)-th connector where a terminal is to be accommodated.

3. A connector supply apparatus according to claim 1, wherein said shifting means is a blower for applying the connectors to be shiftable.

4. A connector supply apparatus according to claim 1, wherein said shifting passage is an accommodating groove.

5. A connector supply apparatus according to claim 2, wherein said separator is a blower located in a direction orthogonal to the direction of shifting the connectors.

6. A connector supply apparatus comprising:

a plurality of rows of rail members each having a shifting passage along which a plurality of connectors are shifted;

shifting means for forcibly shifting the plurality of connectors along the shifting passage;

a pair of forward and backward stoppers so as to be risable/fallable, spaced apart from each other by a prescribed distance in a connector shifting direction above each of said shifting passages, while the plurality of connectors are shifted by said shifting means, the backward stopper rising to open the shifting passage and the forward stopper falling to define the stopping position of the most precedent stopper;

sensors arranged in front of and behind said stoppers for detecting the presence or absence of a connector; and a separator arranged between said stoppers for separating a precedent connector of said plurality of connectors from the succeeding connectors.

* * * * *